United States Patent
Kato et al.

(10) Patent No.: US 9,789,865 B2
(45) Date of Patent: Oct. 17, 2017

(54) HYBRID VEHICLE, CONTROL DEVICE FOR HYBRID VEHICLE, AND CONTROL METHOD FOR HYBRID VEHICLE WITH THROTTLE VALVE CONTROL ACCORDING THE TEMPERATURE OF THE BATTERY

(71) Applicant: TOYOTA JIDOSHA KABUSHIKI KAISHA, Toyota-shi, Aichi-ken (JP)

(72) Inventors: Toshikazu Kato, Toyota (JP); Ryuta Teraya, Okazaki (JP); Yoshikazu Asami, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/101,159

(22) PCT Filed: Dec. 3, 2014

(86) PCT No.: PCT/IB2014/002678
§ 371 (c)(1),
(2) Date: Jun. 2, 2016

(87) PCT Pub. No.: WO2015/082989
PCT Pub. Date: Jun. 11, 2015

(65) Prior Publication Data
US 2017/0001625 A1    Jan. 5, 2017

(30) Foreign Application Priority Data
Dec. 6, 2013   (JP) .................................. 2013-253276

(51) Int. Cl.
*B60W 10/06*   (2006.01)
*B60W 20/15*   (2016.01)
*B60W 20/00*   (2016.01)

(52) U.S. Cl.
CPC ............ *B60W 20/15* (2016.01); *B60W 10/06* (2013.01); *B60W 20/00* (2013.01);
(Continued)

(58) Field of Classification Search
CPC ...... B60W 20/15; B60W 10/06; B60W 20/00; B60W 2510/246; B60W 2710/0605; Y02T 10/6239; Y02T 10/6295; Y10S 903/905
See application file for complete search history.

(56) References Cited

U.S. PATENT DOCUMENTS 6,876,097 B2 * 4/2005 Thomas ................ F02D 31/001
                                          290/40 A
9,303,551 B2 * 4/2016 Kojima ................... B60K 6/48
(Continued)

FOREIGN PATENT DOCUMENTS

FR   EP 2166198 A2 *  3/2010 .............. F01L 1/181
GB      2288636 A  * 10/1995 ................ F01L 1/34
(Continued)

OTHER PUBLICATIONS

Dongsuk et al., "Optimal catalyst temperature management of Plug-in Hybrid Electric Vehicles," Year: 2011, pp. 2732-2738.*
(Continued)

*Primary Examiner* — Tuan C. To
(74) *Attorney, Agent, or Firm* — Finnegan, Henderson, Farabow, Garrett & Dunner, LLP

(57) ABSTRACT

The hybrid vehicle includes an internal combustion engine, a rotary electric machine, an electrical storage device and a controller. The controller is configured to execute output control. An opening degree of the throttle valve is controlled in the output control such that, when a temperature of the electrical storage device is lower than a predetermined temperature, the output of the internal combustion engine is (Continued)

reduced below a predetermined output. The controller is further configured to control the variable valve actuating device such that at least one of a valve lift or valve operating angle of the intake valve at the time when the output control is executed is larger than the corresponding at least one of the valve lift or valve operating angle of the intake valve at the time when the output control is not executed.

8 Claims, 11 Drawing Sheets

(52) U.S. Cl.
CPC .............. *B60W 2510/246* (2013.01); *B60W 2710/0605* (2013.01); *Y02T 10/6239* (2013.01); *Y02T 10/6295* (2013.01); *Y10S 903/905* (2013.01)

(56) References Cited

U.S. PATENT DOCUMENTS

| | | | |
|---|---|---|---|
| 2004/0118367 A1 | 6/2004 | Ezaki et al. | |
| 2009/0143189 A1* | 6/2009 | Hasegawa | B60K 6/48 477/5 |
| 2011/0208382 A1* | 8/2011 | Uchida | B60K 6/445 701/22 |
| 2011/0246008 A1* | 10/2011 | Yoshida | B60K 6/48 701/22 |
| 2012/0029794 A1* | 2/2012 | Tufail | F02D 23/00 701/108 |
| 2012/0041629 A1* | 2/2012 | Yamada | B60K 6/48 701/22 |
| 2012/0132163 A1 | 5/2012 | Shoji et al. | |
| 2012/0136552 A1* | 5/2012 | Kato | F02D 41/22 701/102 |
| 2014/0067200 A1* | 3/2014 | Amano | B60K 6/442 701/34.4 |
| 2015/0295448 A1* | 10/2015 | Sugeno | H01M 10/4207 701/22 |
| 2016/0090076 A1* | 3/2016 | Tsuji | B60K 6/48 477/5 |

FOREIGN PATENT DOCUMENTS

| | | |
|---|---|---|
| JP | 9-242519 | 9/1997 |
| JP | 2004-183610 | 7/2004 |
| JP | 2008-25550 | 2/2008 |
| JP | 2008-180217 | 8/2008 |
| JP | 2011-110960 | 6/2011 |
| JP | 2012-11979 | 1/2012 |
| JP | 2012-117376 | 6/2012 |
| JP | 2013-53610 | 3/2013 |
| KR | 100783925 B1 * | 12/2007 |

OTHER PUBLICATIONS

Lisa et al., "Light Duty Hybrid Vehicles—Influence of Driving Cycle and Operating Temperature on Fuel Economy and GHG Emissions," Year: 2006, pp. 1-6.*

* cited by examiner

ND CONTROL

HYBRID VEHICLE, CONTROL DEVICE FOR HYBRID VEHICLE, AND CONTROL METHOD FOR HYBRID VEHICLE WITH THROTTLE VALVE CONTROL ACCORDING THE TEMPERATURE OF THE BATTERY

CROSS-REFERENCE TO RELATED APPLICATIONS

This application is a national phase application of International Application No. PCT/162014/002678, filed Dec. 3, 2014, and claims the priority of Japanese Application No. 2013-253276, filed Dec. 6, 2013, the content of both of which is incorporated herein by reference.

BACKGROUND OF THE INVENTION

1. Field of the Invention

The invention relates to a hybrid vehicle, a control device for a hybrid vehicle, and a control method for a hybrid vehicle and, more particularly, to a hybrid vehicle that includes an internal combustion engine including a variable valve actuating device for changing the operation characteristic of an intake valve, a control device for the hybrid vehicle, and a control method for the hybrid vehicle.

2. Description of Related Art

Japanese Patent Application Publication No. 2011-110960 (JP 2011-110960 A) describes a hybrid vehicle in which a battery is charged with electric power generated by using an engine. In this hybrid vehicle, when electric power for charging the battery is limited as a result of a decrease in the temperature of the battery, the opening degree of a throttle valve (hereinafter, also referred to as "throttle opening degree") is controlled, and the output of the engine is kept at a low output. Thus, generated electric power is limited, so overcharging of the battery is suppressed.

There is known an engine including a variable valve actuating device for changing the operation characteristic of an intake valve of the engine. There is also known a variable valve actuating device that is configured to be able to change at least one of the valve lift or valve operating angle of an intake valve (see, for example, Japanese Patent Application Publication No. 2004-183610 (JP 2004-183610 A), Japanese Patent Application Publication No. 2013-53610 (JP 2013-53610 A), Japanese Patent Application Publication No. 2008-25550 (JP 2008-25550 A), Japanese Patent Application Publication No. 2012-117376 (JP 2012-117376 A) and Japanese Patent Application Publication No. 9-242519 (JP 9-242519 A)). It is possible to change the operating characteristic of the engine by using the variable valve actuating device. The engine including such a variable valve actuating device can be mounted on a hybrid vehicle.

SUMMARY OF THE INVENTION

In the above-described hybrid vehicle, when the temperature of the battery decreases, electric power for charging the battery is limited in order to protect the battery. At this time, it is required to generate electric power by setting the output of the engine to a low output so that electric power for charging the battery does not become excessive.

At a low temperature, the density of air that is taken into the engine is high, so it may be difficult to set the output of the engine to a low output even by setting the throttle opening degree to a state close to a fully closed state. In this case, it is not possible to suppress electric power generated by the engine to a desired output, so there is a concern that electric power for charging the battery becomes excessive.

The invention is to suppress excessive electric power for charging an electrical storage device in a hybrid vehicle including a variable valve actuating device for changing the operation characteristic of an intake valve.

An aspect of the invention provides a hybrid vehicle. The hybrid vehicle includes an internal combustion engine, a rotary electric machine, an electrical storage device and a controller. The internal combustion engine includes a variable valve actuating device and a throttle valve. The variable valve actuating device is configured to change an operation characteristic of an intake valve. The throttle valve is configured to adjust an amount of air that flows into a cylinder. The rotary electric machine is configured to generate electric power by using an output of the internal combustion engine. The electrical storage device is configured to be charged upon reception of electric power generated by the rotary electric machine. The controller is configured to execute output control. An opening degree of the throttle valve is controlled in the output control such that, when a temperature of the electrical storage device is lower than a predetermined temperature, the output of the internal combustion engine is reduced below a predetermined output. The controller is further configured to control the variable valve actuating device such that at least one of a valve lift or valve operating angle of the intake valve at the time when the output control is executed is larger than the corresponding at least one of the valve lift or valve operating angle of the intake valve at the time when the output control is not executed.

When the output of the internal combustion engine is set to a low output, the torque of the internal combustion engine for the throttle opening degree at the time when at least one of the valve lift or valve operating angle of the intake valve is large is smaller than the torque of the internal combustion engine for the same throttle opening degree at the time when the corresponding at least one of the valve lift or valve operating angle of the intake valve is small. At least one of the valve lift or valve operating angle of the intake valve at the time when the output control is executed is set to be larger than the corresponding at least one of the valve lift or valve operating angle of the intake valve at the time when the output control is not executed. That is, when the output control is executed, the throttle opening degree that is required to set the output of the internal combustion engine to a low output increases. Therefore, the throttle opening degree is controlled in a region remote from a state close to a fully closed state, so it is possible to set the output of the internal combustion engine to a low output. Thus, it is possible to reduce electric power that is generated by the internal combustion engine to a desired output. Thus, with the above hybrid vehicle, it is possible to suppress excessive electric power for charging the electrical storage device in the hybrid vehicle including the variable valve actuating device for changing the operation characteristic of the intake valve.

In addition, a change in the amount of air that is introduced into the cylinder for a change in the throttle opening degree at the time when at least one of the valve lift or valve operating angle of the intake valve is large is milder than a change in the amount if air that is introduced into the cylinder for a change in the throttle opening degree at the time when the corresponding at least one of the valve lift or valve operating angle of the intake valve is small. At least one of the valve lift or valve operating angle of the intake valve at the time when the output control is executed is set to be larger than the corresponding at least one of the valve lift or valve operating angle of the intake valve at the time when the output control is not executed. That is, when the output control is executed, controllability of the amount of air that is introduced into the cylinder improves. As a result, it is possible to further stably set the output of the internal combustion engine to a low output.

In the above aspect, the variable valve actuating device may be configured to change the operation characteristic of the intake valve to any one of a first characteristic, a second characteristic and a third characteristic. At least one of the valve lift or the valve operating angle of the second characteristic may be larger than the corresponding at least one of the valve lift or the valve operating angle of the first characteristic. At least one of the valve lift or the valve operating angle of the third characteristic may be larger than the corresponding at least one of the valve lift or the valve operating angle of the second characteristic.

With this configuration, the operation characteristic, that is, the valve lift and valve operation angle, of the intake valve is limited to three characteristics. Therefore, it is possible to reduce a time that is required to adapt control parameters for controlling the operating state of the engine. In addition, it is possible to further simplify the configuration of the actuator.

In the above aspect, the variable valve actuating device may be configured to change the operation characteristic of the intake valve to one of a first characteristic and a second characteristic. At least one of the valve lift or the valve operating angle of the second characteristic may be larger than the corresponding at least one of the valve lift or the valve operating angle of the first characteristic.

With the above configuration, the operation characteristic, that is, the valve lift and valve operating angle, of the intake valve is limited to two characteristics. Therefore, it is possible to further reduce a time that is required to adapt control parameters for controlling the operating state of the engine. In addition, it is possible to further simplify the configuration of the actuator.

In the above aspect, electric power for charging the electrical storage device at the time when the electrical storage device is in a second state may be more limited than electric power for charging the electrical storage device at the time when the electrical storage device is in a first state. The temperature of the electrical storage device in the second state may be lower than the temperature of the electrical storage device in the first state. In addition, the controller may be configured to execute the output control when the electrical storage device is in the second state.

With this configuration, when the electric power for charging the electrical storage device is limited at the time when the temperature of the electrical storage device is low, it is possible to suppress excessive electric power for charging the electrical storage device.

In the above aspect, the controller may be configured to execute feedback control over the opening degree of the throttle valve such that the opening degree of the throttle valve approaches a target opening degree. The target opening degree may be the opening degree of the throttle valve, at which the output of the internal combustion engine is lower than the predetermined output.

With this configuration, by increasing the valve lift and valve operating angle of the intake valve, it is possible to expand the control range of the throttle opening degree that is required to execute the output control. Therefore, it becomes easy to keep the engine torque at a desired output through feedback control over the throttle opening degree.

In the above aspect, the controller may be configured to execute feedforward control over the opening degree of the throttle valve such that the opening degree of the throttle valve becomes a target opening degree. The target opening degree may be the opening degree of the throttle valve, at which the output of the internal combustion engine is lower than the predetermined output.

With this configuration, by increasing the valve lift and valve operating angle of the intake valve, it is possible to increase the throttle opening degree that is required to execute the output control. Therefore, it becomes easy to keep the engine torque at a desired output through feedforward control over the throttle opening degree.

Another aspect of the invention provides a control device for a hybrid vehicle. The hybrid vehicle includes an internal combustion engine, a rotary electric machine and an electrical storage device. The internal combustion engine includes a variable valve actuating device and a throttle valve. The variable valve actuating device is configured to change an operation characteristic of an intake valve. The throttle valve is configured to adjust an amount of air that flows into a cylinder. The control device includes a controller. The controller is configured to execute output control. An opening degree of the throttle valve is controlled in the output control such that, when a temperature of the electrical storage device is lower than a predetermined temperature, an output of the internal combustion engine is reduced below a predetermined output. The controller is configured to control the variable valve actuating device such that at least one of a valve lift or valve operating angle of the intake valve at the time when the output control is executed is larger than the corresponding at least one of the valve lift or valve operating angle of the intake valve at the time when the output control is not executed.

Further another aspect of the invention provides a control method for a hybrid vehicle. The hybrid vehicle includes an internal combustion engine, a rotary electric machine, an electrical storage device and a controller. The internal combustion engine includes a variable valve actuating device and a throttle valve. The variable valve actuating device is configured to change an operation characteristic of an intake valve. The throttle valve is configured to adjust an amount of air that flows into a cylinder. The control method includes executing output control by the controller. An opening degree of the throttle valve is controlled in the output control such that, when a temperature of the electrical storage device is lower than a predetermined temperature, an output of the internal combustion engine is reduced below a predetermined output. The control method further includes controlling the variable valve actuating device by the controller such that at least one of a valve lift or valve operating angle of the intake valve at the time when the output control is executed is larger than the corresponding at least one of the valve lift or valve operating angle of the intake valve at the time when the output control is not executed.

According to the invention, it is possible to suppress excessive electric power for charging an electrical storage device in a hybrid vehicle including a variable valve actuating device for changing the operation characteristic of an intake valve.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
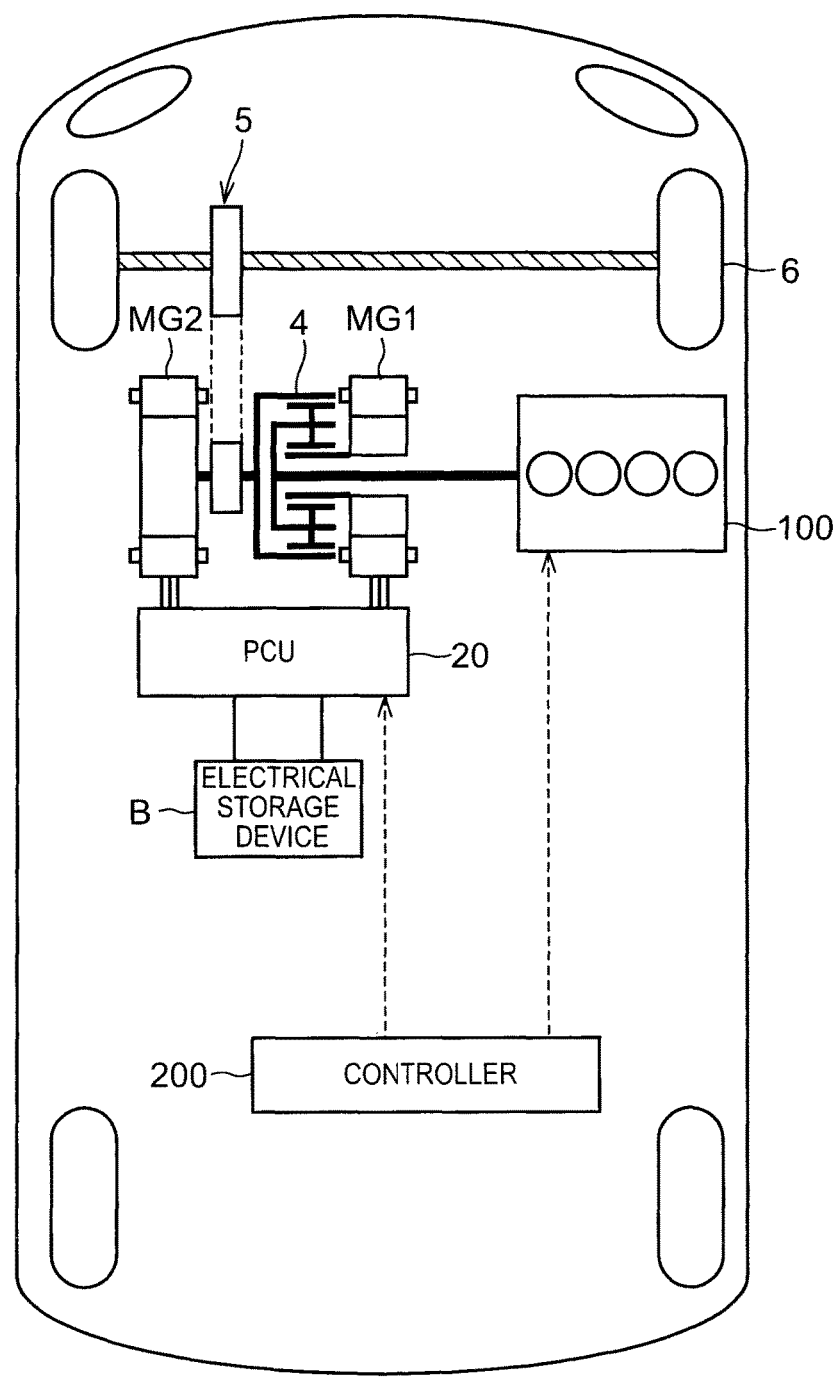
FIG. 1 is a block diagram that shows the overall configuration of a hybrid vehicle to which a controller according to an embodiment of the invention is applied.

Hereinafter, embodiments of the invention will be described in detailed with reference to the accompanying drawings. Like reference numerals denote the same or corresponding portions in the drawings, and the description thereof will not be repeated.

FIG. 1 is a block diagram that shows the overall configuration of a hybrid vehicle to which a controller according to an embodiment of the invention is applied. As shown in FIG. 1, the hybrid vehicle 1 includes an engine 100, motor generators MG1, MG2, a power split device 4, a reduction gear 5, drive wheels 6, an electrical storage device B, a power control unit (PCU) 20, and a controller 200.

The hybrid vehicle 1 travels by using driving force that is output from at least one of the engine 100 or the motor generator MG2. Driving force that is generated by the engine 100 is split by the power split device 4 into two paths. One of the paths is a path through which driving force is transmitted to the drive wheels 6 via the reduction gear 5. The other one of the paths is a path through which driving force is transmitted to the motor generator MG1.

The electrical storage device B is an electric power storage element configured to be rechargeable and dischargeable. The electrical storage device B includes a secondary battery, such as a lithium ion battery, a nickel-metal hydride battery and a lead storage battery, or a cell of an electrical storage element, such as an electric double layer capacitor.

The electrical storage device B is connected to the PCU 20 for driving the motor generators MG1, MG2. The electrical storage device B supplies the PCU 20 with electric power for generating the driving force of the hybrid vehicle 1. The electrical storage device B stores electric power generated by the motor generators MG1, MG2. The output of the electrical storage device B is, for example, 200 V.

The PCU 20 converts direct-current power, which is supplied from the electrical storage device B, to alternating-current power, and drives the motor generators MG1, MG2 by using the alternating-current power. The PCU 20 converts alternating-current power, generated by the motor generators MG1, MG2, to direct-current power, and charges the electrical storage device B with the direct-current power.

The controller 200 is formed of an electronic control unit (ECU). The ECU includes a central processing unit (CPU), a storage device, input/output buffers, and the like (which are not shown). The controller 200 receives signals input from various sensors and output control signals to devices, and controls the devices in the hybrid vehicle 1. As an example, the controller 200 executes traveling control over the hybrid vehicle 1, charging control over the electrical storage device B, control over the engine 100 including a variable valve actuating device, and the like. The configuration of the controller 200 will be described later.

Figure 2:
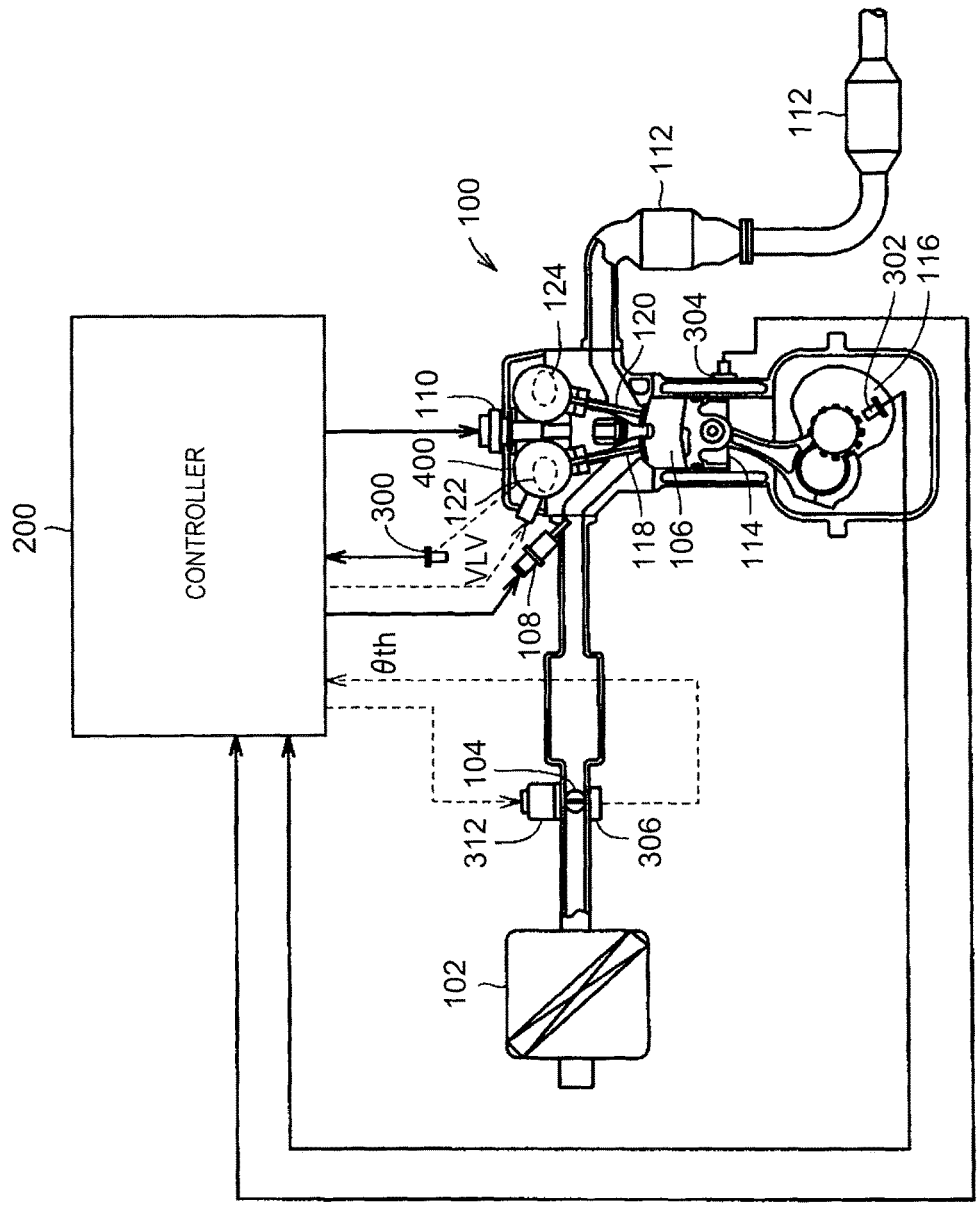
FIG. 2 is a view that shows the configuration of an engine shown in FIG. 1.

FIG. 2 is a view that shows the configuration of the engine 100 shown in FIG. 1. As shown in FIG. 2, air is taken into the engine 100 through an air cleaner 102. An intake air amount is adjusted by a throttle valve 104. The throttle valve 104 is an electrically controlled throttle valve that is driven by a throttle motor 312.

Each injector 108 injects fuel toward a corresponding intake port. Air mixed with fuel in each intake port is introduced into a corresponding cylinder 106.

In the present embodiment, the engine 100 will be described as a port injection-type engine in which an injection hole of each injector 108 is provided in the corresponding intake port. In addition to each port injection injector 108, a direct injection injector that directly injects fuel into the corresponding cylinder 106 may be provided. Furthermore, only a direct injection injector may be provided.

Air-fuel mixture in each cylinder 106 is ignited by a corresponding ignition plug 110 to combust. The combusted air-fuel mixture, that is, exhaust gas, is purified by a three-way catalyst 112, and is then emitted to the outside of the vehicle. A piston 114 is pushed downward by combustion of air-fuel mixture, and a crankshaft 116 rotates.

An intake valve 118 and an exhaust valve 120 are provided at the top portion of each cylinder 106. The amount of air that is introduced into each cylinder 106 and the timing of introduction are controlled by the corresponding intake valve 118. The amount of exhaust gas that is emitted from each cylinder 106 and the timing of emission are controlled by the corresponding exhaust valve 120. Each intake valve 118 is driven by a cam 122. Each exhaust valve 120 is driven by a cam 124.

As will be described in detail later, the valve lift and valve operating angle of each intake valve 118 are controlled by a variable valve lift (VVL) device 400. The valve lift and valve operating angle of each exhaust valve 120 may also be controlled. A variable valve timing (VVT) device that controls the open/close timing may be combined with the VVL device 400.

The controller 200 controls a throttle opening degree θth, an ignition timing, a fuel injection timing, a fuel injection amount, and the operating state (open/close timing, valve lift, valve operating angle, and the like) of each intake valve so that the engine 100 is placed in a desired operating state. The throttle opening degree θth indicates the opening degree of a throttle valve 104. Signals are input to the controller 200 from various sensors, that is, a cam angle sensor 300, a crank angle sensor 302, a knock sensor 304 and a throttle opening degree sensor 306.

The cam angle sensor 300 outputs a signal indicating a cam position. The crank angle sensor 302 outputs signals indicating the rotation speed of the crankshaft 116 (engine rotation speed) and the rotation angle of the crankshaft 116. The knock sensor 304 outputs a signal indicating the strength of vibrations of the engine 100. The throttle opening degree sensor 306 outputs a signal indicating the throttle opening degree θth.

Figure 3:
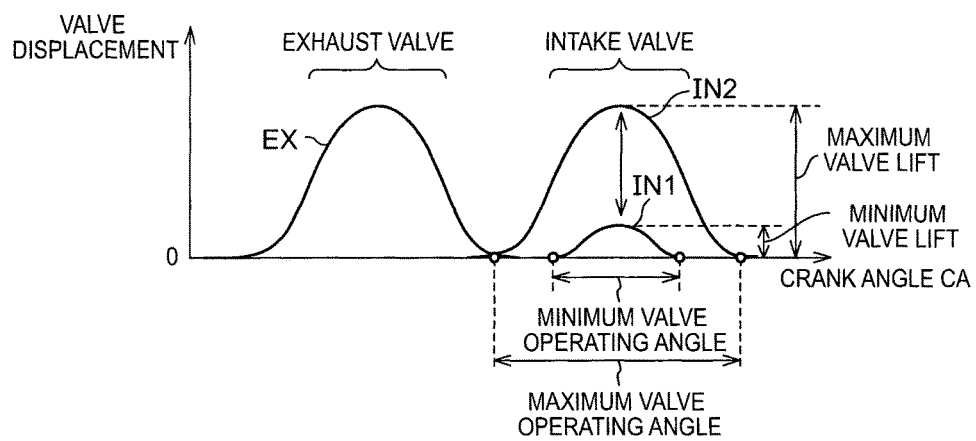
FIG. 3 is a graph that shows the correlation between a crank angle and a valve displacement that is achieved by a VVL device.

FIG. 3 is a graph that shows the correlation between a crank angle and a valve displacement that is achieved by the VVL device 400. As shown in FIG. 3, each exhaust valve 120 opens and closes in an exhaust stroke, and each intake valve 118 opens and closes in an intake stroke. The valve displacement of each exhaust valve 120 is indicated by a waveform EX. The valve displacement of each intake valve 118 is indicated by waveforms IN1, IN2.

The valve displacement is a displacement of each intake valve 118 from a state where the intake valve 118 is closed. The valve lift is a valve displacement at the time when the opening degree of each intake valve 118 has reached a peak. The valve operating angle is a crank angle of a period from when each intake valve 118 opens to when the intake valve 118 closes.

The operation characteristic of each intake valve 118 is changed by the VVL device 400 between the waveforms IN1, IN2. The waveform IN1 indicates the case where the valve lift and the valve operating angle are minimum. The waveform IN2 indicates the case where the valve lift and the valve operating angle are maximum. In the VVL device 400, the valve operating angle increases with an increase in the valve lift.

Figure 4:
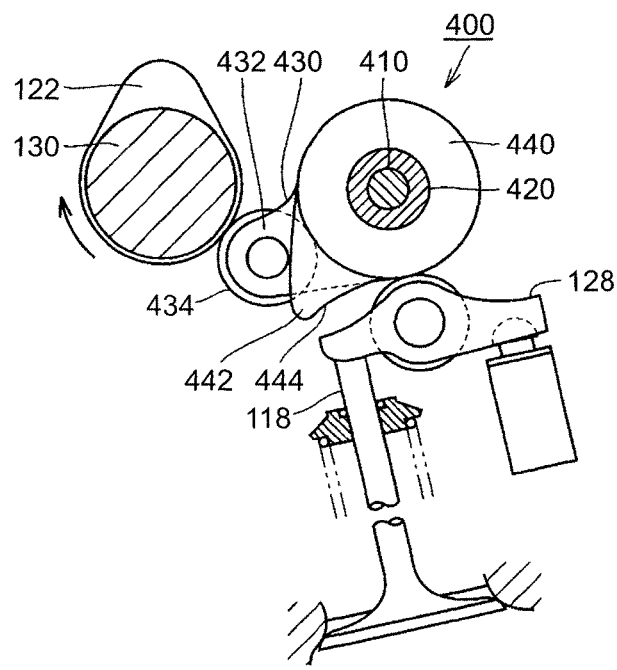
FIG. 4 is a front view of the VVL device that is one example of a device that controls the valve lift and valve operating angle of each intake valve.

FIG. 4 is a front view of the VVL device 400 that is one example of a device that controls the valve lift and valve operating angle of each intake valve 118. As shown in FIG. 4, the VVL device 400 includes a drive shaft 410, a support pipe 420, an input arm 430, and oscillation cams 440. The drive shaft 410 extends in one direction. The support pipe 420 covers the outer periphery of the drive shaft 410. The input arm 430 and the oscillation cams 440 are arranged in the axial direction of the drive shaft 410 on the outer periphery of the support pipe 420. An actuator (not shown) that linearly actuates the drive shaft 410 is connected to the distal end of the drive shaft 410.

The VVL device 400 includes the one input arm 430 in correspondence with the one cam 122 provided in each cylinder. The two oscillation cams 440 are provided on both sides of each input arm 430 in correspondence with the pair of intake valves 118 provided for each cylinder.

The support pipe 420 is formed in a hollow cylindrical shape, and is arranged parallel to a camshaft 130. The support pipe 420 is fixed to a cylinder head so as not to be moved in the axial direction or rotated.

The drive shaft 410 is inserted inside the support pipe 420 so as to be slidable in the axial direction. The input arm 430 and the two oscillation cams 440 are provided on the outer periphery of the support pipe 420 so as to be oscillatable about the axis of the drive shaft 410 and not to move in the axial direction.

The input arm 430 includes an arm portion 432 and a roller portion 434. The arm portion 432 protrudes in a direction away from the outer periphery of the support pipe 420. The roller portion 434 is rotatably connected to the distal end of the arm portion 432. The input arm 430 is provided such that the roller portion 434 is arranged at a position at which the roller portion 434 is able to contact the cam 122.

Each oscillation cam 440 has a substantially triangular nose portion 442 that protrudes in a direction away from the outer periphery of the support pipe 420. A concave cam face 444 is formed at one side of the nose portion 442. A roller rotatably attached to a rocker arm 128 is pressed against the cam face 444 by the urging force of a valve spring provided in the intake valve 118.

The input arm 430 and the oscillation cams 440 integrally oscillate about the axis of the drive shaft 410. Therefore, as the camshaft 130 rotates, the input arm 430 that is in contact with the cam 122 oscillates, and the oscillation cams 440 oscillate in interlocking with movement of the input arm 430. The movements of the oscillation cams 440 are transferred to the intake valves 118 via the rocker arms 128, and the intake valves 118 are opened or closed.

The VVL device 400 further includes a device that changes a relative phase difference between the input arm 430 and each oscillation cam 440 around the axis of the support pipe 420. The valve lift and valve operating angle of each intake valve 118 are changed as needed by the device that changes the relative phase difference.

That is, when the relative phase difference between the input arm 430 and each oscillation cam 440 is increased, the oscillation angle of each rocker arm 128 is increased with respect to the oscillation angle of each of the input arm 430 and the oscillation cams 440, and the valve lift and valve operating angle of each intake valve 118 are increased.

When the relative phase difference between the input arm 430 and each oscillation cam 440 is reduced, the oscillation angle of each rocker arm 128 is reduced with respect to the oscillation angle of each of the input arm 430 and the oscillation cams 440, and the valve lift and valve operating angle of each intake valve 118 are reduced.

Figure 5:
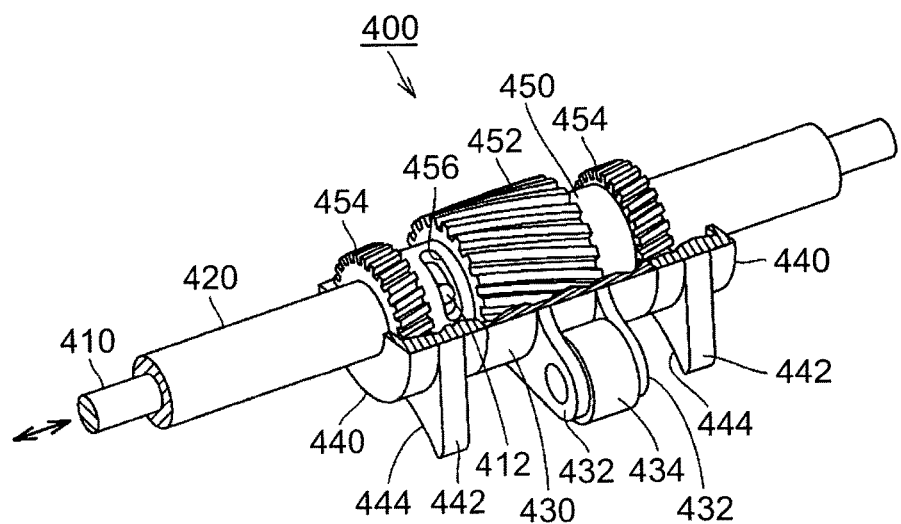
FIG. 5 is a perspective view that partially shows the VVL device.

FIG. 5 is a perspective view that partially shows the VVL device 400. FIG. 5 shows a structure with part cut away so that the internal structure is clearly understood.

As shown in FIG. 5, a slider gear 450 is accommodated in a space defined between the outer periphery of the support pipe 420 and the set of input arm 430 and two oscillation cams 440. The slider gear 450 is supported on the support pipe 420 so as to be rotatable and slidable in the axial direction. The slider gear 450 is provided on the support pipe 420 so as to be slidable in the axial direction.

The slider gear 450 includes a helical gear 452. The helical gear 452 is located at the center portion of the slider gear 450 in the axial direction. Right-handed screw spiral helical splines are formed on the helical gear 452. The slider gear 450 includes helical gears 454. The helical gears 454 are respectively located on both sides of the helical gear 452. Left-handed screw spiral helical splines opposite to those of the helical gear 452 are formed on each of the helical gears 454.

On the other hand, helical splines corresponding to the helical gears 452, 454 are respectively formed on the inner peripheries of the input arm 430 and two oscillation cams 440. The inner peripheries of the input arm 430 and two oscillation cams 440 define a space in which the slider gear 450 is accommodated. That is, the right-handed spiral helical splines are formed on the input arm 430, and the helical splines are in mesh with the helical gear 452. The left-handed spiral helical splines are formed on each of the oscillation cams 440, and the helical splines are in mesh with the corresponding helical gear 454.

An oblong hole 456 is formed in the slider gear 450. The oblong hole 456 is located between the helical gear 452 and one of the helical gears 454, and extends in the circumferential direction. Although not shown in the drawing, an oblong hole is formed in the support pipe 420, and the oblong hole extends in the axial direction so as to partially overlap with the oblong hole 456. A locking pin 412 is integrally provided in the drive shaft 410 inserted inside the support pipe 420. The locking pin 412 protrudes through the overlapped portions of these oblong hole 456 and oblong hole (not shown).

When the drive shaft 410 is moved in the axial direction by the actuator (not shown) coupled to the drive shaft 410, the slider gear 450 is pressed by the locking pin 412, and the helical gears 452, 454 move in the axial direction of the drive shaft 410 at the same time. When the helical gears 452, 454 are moved in this way, the input arm 430 and the oscillation cams 440 spline-engaged with these helical gears 452, 454 do not move in the axial direction. Therefore, the input arm 430 and the oscillation cams 440 pivot around the axis of the drive shaft 410 through meshing of the helical splines.

At this time, the helical splines respectively formed on the input arm 430 and each oscillation cam 440 have opposite orientations. Therefore, the pivot direction of the input arm 430 and the pivot direction of each oscillation cam 440 are opposite to each other. Thus, the relative phase difference between the input arm 430 and each oscillation cam 440 changes, with the result that the valve lift and valve operating angle of each intake valve 118 are changed as is already described. The VVL device is not limited to this type. For example, a VVL device that electrically drives each valve, a VVL device that hydraulically drives each valve, or the like, may be used.

The controller 200 controls the valve lift and valve operating angle of each intake valve 118 by adjusting an operation amount of the actuator that linearly moves the drive shaft 410.

Figure 6:
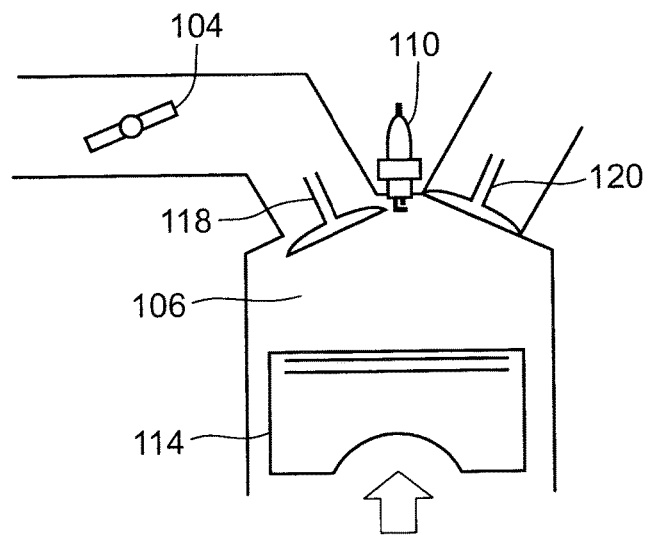
FIG. 6 is a view that illustrates an operation at the time when the valve lift and valve operating angle of each intake valve are large.
Figure 7:
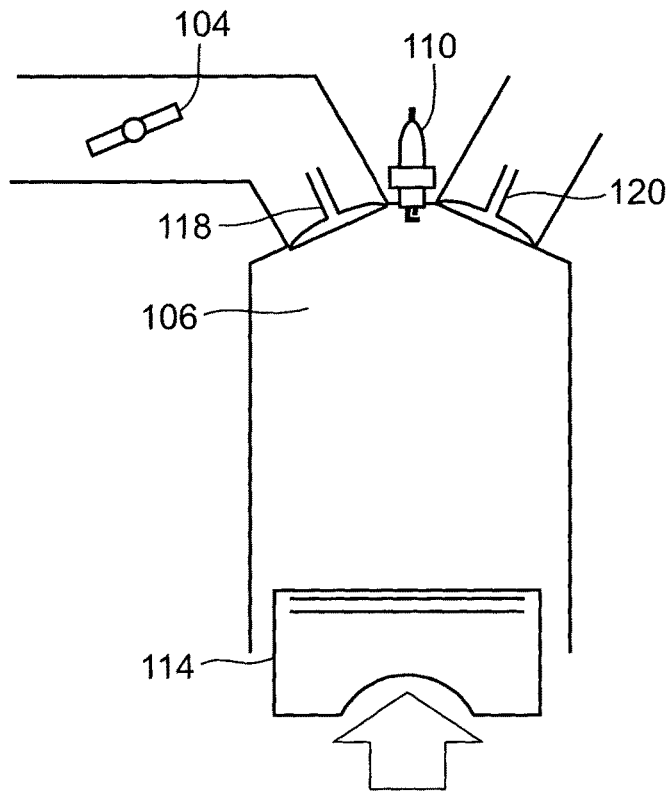
FIG. 7 is a view that illustrates an operation at the time when the valve lift and valve operating angle of each intake valve are small.

FIG. 6 is a view that illustrates an operation at the time when the valve lift and valve operating angle of each intake valve 118 are large. FIG. 7 is a view that illustrates an operation at the time when the valve lift and valve operating angle of each intake valve 118 are small. As shown in FIG. 6 and FIG. 7, when the valve lift and valve operating angle of each intake valve 118 are large, because the close timing of each intake valve 118 delays, the engine 100 runs on the Atkinson cycle. That is, part of air taken into the cylinder 106 in the intake stroke is returned to the outside of the cylinder 106, so the amount of air that can be taken into the cylinder 106 decreases. Thus, outputtable torque of the engine 100 relatively decreases; however, fuel economy improves owing to the Atkinson cycle.

On the other hand, when the valve lift and valve operating angle of each intake valve 118 are small, the close timing of each intake valve 118 advances, and the engine 100 runs on the Otto cycle. Therefore, the amount of air that can be taken into the cylinder 106 increases. Thus, outputtable torque of the engine 100 relatively increases; however, fuel economy is lower than that in the Atkinson cycle.

When improvement in fuel economy of the engine 100 is given a higher priority, the valve lift and valve operating angle of each intake valve 118 are increased; whereas, when ensuring the output of the engine 100 is given a higher priority, the valve lift and valve operating angle of each intake valve 118 are reduced. In this way, it is possible to achieve both improvement in fuel economy and ensuring the output by changing the valve lift and valve operating angle of each intake valve 118.

Figure 8:
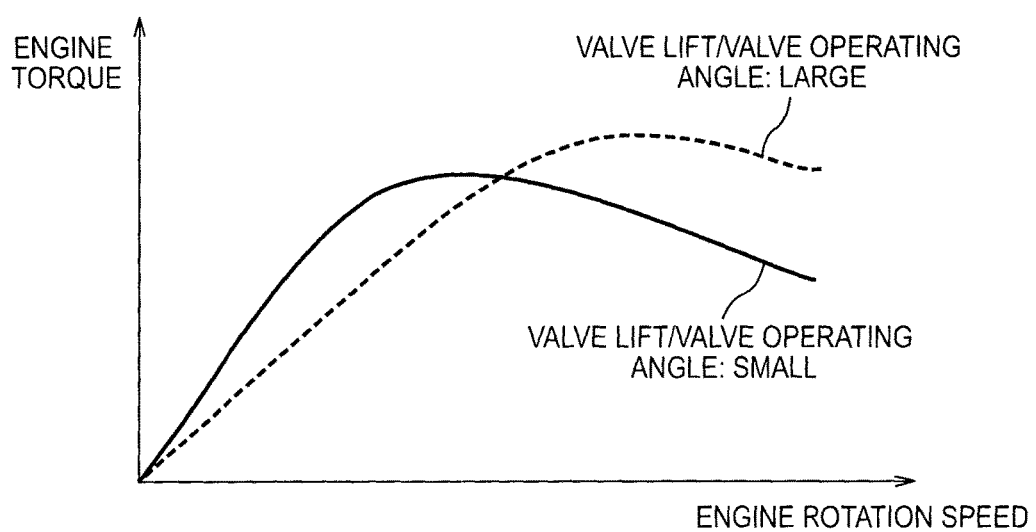
FIG. 8 is a graph that illustrates a difference in engine torque due to the characteristic of each intake valve.

FIG. 8 is a graph that illustrates a difference in engine torque due to the characteristic of each intake valve 118. In FIG. 8, the abscissa axis represents engine rotation speed, and the ordinate axis represents engine torque. In FIG. 8, the continuous line indicates the case where the valve lift and the valve operating angle are small, and the dashed line indicates the case where the valve lift and the valve operating angle are large.

As shown in FIG. 8, in a region in which the engine rotation speed is low, an outputtable engine torque in the case where the valve lift and the valve operating angle are small is larger than the outputtable engine torque in the case where the valve lift and the valve operating angle are large. This is because, when the valve lift and the valve operating angle are large as described above, part of air taken into the cylinder is returned to the outside of the cylinder and, therefore, the amount of air that can be taken into the cylinder 106 decreases. On the other hand, when the valve lift and the valve operating angle are small, each intake valve 118 is early closed, so it is possible to introduce a larger amount of air into the cylinder 106, with the result that the outputtable torque of the engine 100 increases.

On the other hand, in a region in which the engine rotation speed is high, the outputtable engine torque in the case where the valve lift and the valve operating angle are large is larger than the outputtable engine torque in the case where the valve lift and the valve operating angle are small. This is because it is possible to introduce a larger amount of air into the cylinder 106 by utilizing the inertial force of air in the case where the valve lift and the valve operating angle are large.

In the above configuration, when the temperature of the electrical storage device B decreases, electric power for charging the electrical storage device B is limited in order to protect the electrical storage device B. When electric power for charging the electrical storage device B is limited at the time when the electrical storage device B is charged by driving the engine 100, it is required to generate electric power by setting the output of the engine 100 to a low output so that electric power for charging the electrical storage device B does not become excessive.

At a low temperature, the density of air that is taken into the engine 100 is high, so it may be difficult to set the output of the engine 100 to a low output even by setting the throttle opening degree to a state close to a fully closed state. In this case, it is not possible to suppress electric power that is generated by the engine 100 to a desired output, so there is a concern that electric power for charging the electrical storage device B becomes excessive.

In the present embodiment, the VVL device 400 is controlled such that the valve lift and valve operating angle of each intake valve 118 at the time when low output control is executed are larger than the valve lift and valve operating angle of each intake valve 118 at the time when the low output control is not executed. In the low output control, the throttle opening degree is controlled such that the output of the engine 100 is reduced below a predetermined output in the case where the temperature of the electrical storage device B is lower than a predetermined temperature. The predetermined temperature is such that electric power for charging the electrical storage device B is limited when the temperature of the electrical storage device B becomes lower than the predetermined temperature. The predetermined output is the output of the engine 100, which is determined so that electric power for charging the electrical storage device B does not become excessive.

Figure 9:
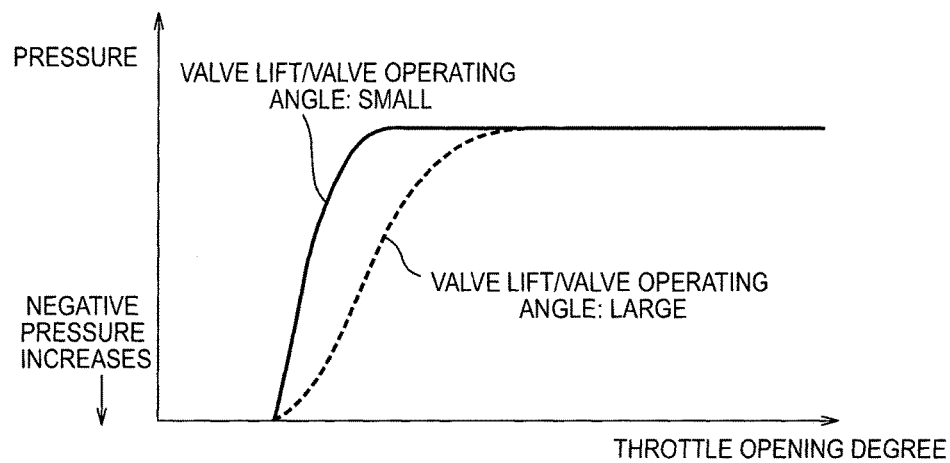
FIG. 9 is a graph that shows the correlation between a throttle opening degree and a pressure in an intake pipe.
Figure 10:
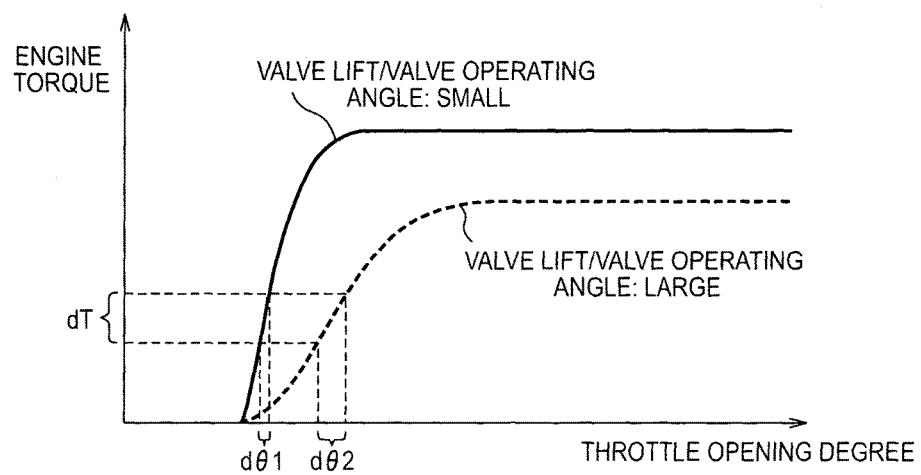
FIG. 10 is a graph that shows the correlation between a throttle opening degree and an engine torque.

FIG. 9 is a graph that shows the correlation between a throttle opening degree and a pressure in an intake pipe. In FIG. 9, the abscissa axis represents throttle opening degree, and the ordinate axis represents pressure in the intake pipe for introducing air into the cylinders. FIG. 10 is a graph that shows the correlation between a throttle opening degree and an engine torque. The abscissa axis represents throttle opening degree, and the ordinate axis represents engine torque. In FIG. 9 and FIG. 10, the continuous line indicates the case where the valve lift and the valve operating angle are small, and the dashed line indicates the case where the valve lift and the valve operating angle are large.

As shown in FIG. 9 and FIG. 10, in the case where the output of the engine 100 is kept at a low output, the torque of the engine 100 for the same throttle opening degree when the valve lift and valve operating angle of each intake valve 118 are large is smaller than that when the valve lift and valve operating angle of each intake valve 118 are small. As an example, in the case where the electrical storage device B is charged at a low temperature, it is required to control the torque of the engine 100 within a predetermined range dT in order to suppress overcharging of the electrical storage device B.

When the valve lift and valve operating angle of each intake valve 118 are small, it is required to control the throttle opening degree within a range dθ1. On the other hand, when the valve lift and valve operating angle of each intake valve 118 are large, the throttle opening degree is controlled within a range dθ2 larger than the range dθ1. That is, the throttle opening degree that is required to keep the output of the engine 100 at a low output when the valve lift and valve operating angle of each intake valve 118 are large is larger than that when the valve lift and valve operating angle of each intake valve 118 are small. Therefore, the throttle opening degree is controlled in a region remote from a state close to a fully closed state, so it is possible to keep the output of the engine 100 at a low output. Thus, it is possible to reduce electric power that is generated by the engine 100 to a desired output, so it is possible to suppress excessive electric power for charging the electrical storage device B.

In a region in which the throttle opening degree is small, the pressure in the intake pipe changes for the throttle opening degree more steeply in the case where the valve lift and valve operating angle of each intake valve 118 are small than in the case where the valve lift and valve operating angle of each intake valve 118 are large. That is, a change in the amount of air that is introduced into the cylinders for a change in throttle opening degree at the time when the valve lift and valve operating angle of each intake valve 118 are large is milder than that at the time when the valve lift and valve operating angle of each intake valve 118 are small.

Thus, the throttle opening degree range dθ2 that is allowed to keep the engine torque within the predetermined range dT in the case where the valve lift and valve operating angle of each intake valve 118 are large is wider than the throttle opening degree range dθ1 that is allowed to keep the engine torque within the predetermined range dT in the case where the valve lift and valve operating angle of each intake valve 118 are small. Thus, by increasing the valve lift and valve operating angle of each intake valve 118, it is possible to improve controllability of the amount of air that is taken in by the throttle valve 104. As a result, it is possible to further stably keep the output of the engine 100 at a low power. Hereinafter, the details of the intake valve control will be specifically described.

Figure 11:
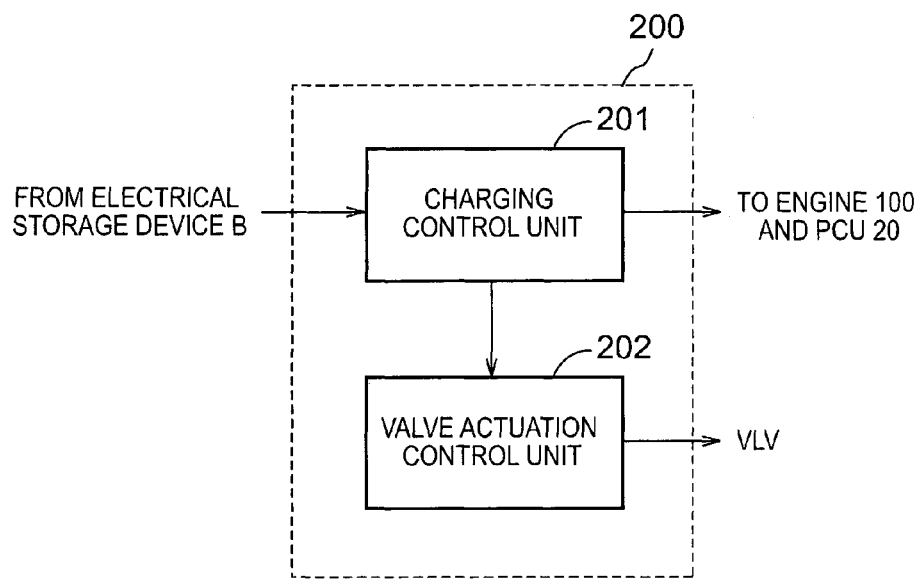
FIG. 11 is a functional block diagram associated with intake valve control that is executed by the controller shown in FIG. 1.

FIG. 11 is a functional block diagram associated with intake valve control that is executed by the controller 200 shown in FIG. 1. The functional blocks shown in the functional block diagram of FIG. 11 are implemented by the controller 200 executing hardware processing or software processing.

As shown in FIG. 11, the controller 200 includes a charging control unit 201 and a valve actuation control unit 202.

The charging control unit 201 calculates an SOC on the basis of the voltage Vb and current Ib of the electrical storage device B, which are detected by sensors (not shown). The SOC indicates a state of charge of the electrical storage device B. The charging control unit 201 controls the amount of charge of the electrical storage device B so that the SOC of the electrical storage device B is kept within a predetermined range. The predetermined range is a usable SOC range.

Specifically, when the SOC of the electrical storage device B decreases and charging of the electrical storage device B is required, the charging control unit 201 starts up the engine 100 and controls the motor generator MG1 so that electric power is generated. The electrical storage device B is charged with electric power generated by the motor generator MG1.

At this time, when a predetermined condition is satisfied at the time when charging of the electrical storage device B is required, the charging control unit 201 executes low output control. In the low output control, the throttle opening degree is controlled such that the output of the engine 100 is reduced below a predetermined output. The predetermined condition is satisfied when the temperature of the electrical storage device B is lower than a predetermined temperature. The predetermined condition may be satisfied when the temperature of the electrical storage device B is lower than the predetermined temperature and electric power for charging the electrical storage device B is limited. The predetermined condition may be satisfied when the temperature of the electrical storage device B is lower than the predetermined temperature and electric power consumed by an electrical device that uses electric power from the electrical storage device B is lower than a predetermined electric power while the hybrid vehicle 1 is stopped.

The charging control unit 201 outputs, to the valve actuation control unit 202, a signal indicating an execution status of the low output control. The charging control unit 201 generates signals for controlling the engine 100 and the PCU 20, and outputs the generated signals to the engine 100 and the PCU 20.

The valve actuation control unit 202 controls the VVL device 400 such that the valve lift and valve operating angle of each intake valve 118 at the time when the low output control is executed are larger than the valve lift and valve operating angle of each intake valve 118 at the time when the low output control is not executed. The valve actuation control unit 202 generates a signal VLV for controlling the VVL device 400, and outputs the generated signal VLV to the VVL device 400. Thus, a required throttle opening degree increases. Therefore, the throttle opening degree is controlled in a region remote from a state close to a fully closed state, so it is possible to keep the output of, the engine 100 at a low output.

Figure 12:
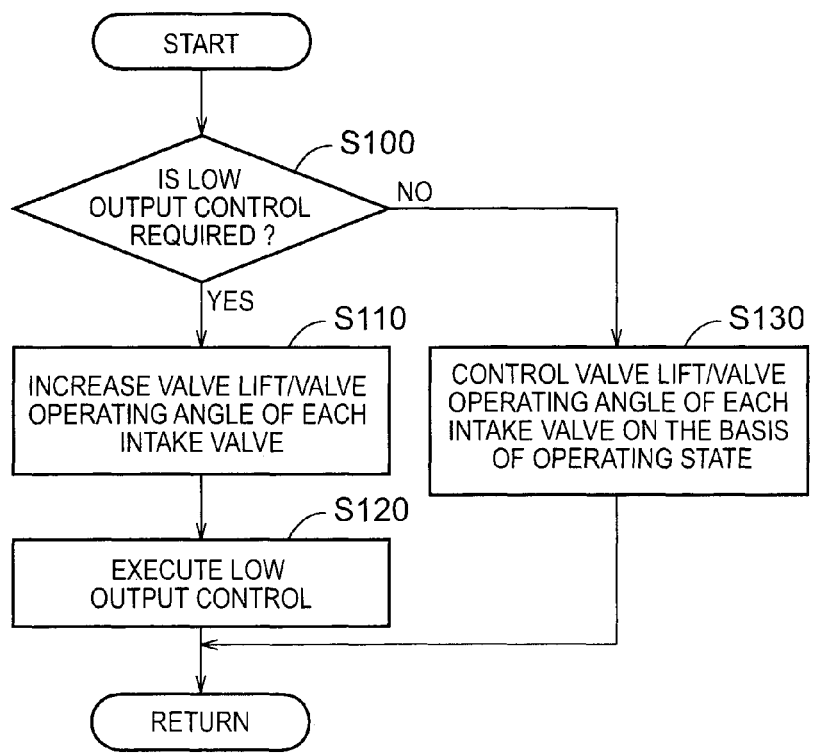
FIG. 12 is a flowchart that shows the control structure of intake valve control that is executed by the controller shown in FIG. 1.

FIG. 12 is a flowchart that shows the control structure of intake valve control that is executed by the controller 200 shown in FIG. 1. The flowchart shown in FIG. 12 is implemented by executing a program, prestored in the controller 200, at predetermined intervals. Alternatively, the processes of part of the steps may be implemented by constructing exclusive hardware (electronic circuit).

As shown in FIG. 12, the controller 200 determines in step (hereinafter, step is abbreviated as "S") 100 whether the low output control is required. The low output control is required when the above-described condition is satisfied at the time when charging of the electrical storage device B is required.

When it is determined that the low output control is required (YES in S100), the controller 200 controls the VVL device 400 such that the valve lift and valve operating angle of each intake valve 118 are increased (S110). Subsequently, in S120, the controller 200 executes the low output control.

On the other hand, when it is determined that the low output control is not required (NO in S100), the controller 200 controls the valve lift and valve operating angle of each intake valve 118 on the basis of the operating state of the engine 100 (S130). As an example, when the outside air temperature is extremely low, the controller 200 controls the VVL device 400 such that the valve lift and valve operating angle of each intake valve 118 are reduced in order to improve ignitability.

As described above, in this embodiment, the controller 200 controls the VVL device 400 such that the valve lift and valve operating angle of each intake valve 118 at the time when the low output control is executed are larger than the valve lift and valve operating angle of each intake valve 118 at the time when the low output control is not executed. When the output of the engine 100 is set to a low output, the torque of the engine 100 for the throttle opening degree at the time when the valve lift and valve operating angle of each intake valve 118 are large is smaller than the torque of the engine 100 for the same throttle opening degree at the time when the valve lift and valve operating angle of each intake valve 118 are small. At least one of the valve lift or valve operating angle of each intake valve 118 at the time when the low output control is executed is set to be larger than the corresponding at least one of the valve lift or valve operating angle of each intake valve 118 at the time when the low output control is not executed. That is, when the low output control is executed, the throttle opening degree that is required to set the output of the engine 100 to a low output increases.

Therefore, the throttle opening degree is controlled in a region remote from a state close to a fully closed state, so it is possible to set the output of the engine 100 to a low output. Thus, it is possible to reduce electric power that is generated by the engine 100 to a desired output. Thus, according to this embodiment, it is possible to suppress excessive electric power for charging the electrical storage device B.

In addition, a change in the amount of air that is introduced into the cylinders for a change in the throttle opening degree at the time when the valve lift and valve operating angle of each intake valve 118 are large is milder than a change in the amount of air that is introduced into the cylinders for a change in the throttle opening degree at the time when the valve lift and valve operating angle of each intake valve 118 are small. At least one of the valve lift or valve operating angle of each intake valve 118 at the time when the low output control is executed is set to be larger than the corresponding at least one of the valve lift or valve operating angle of each intake valve 118 at the time when the low output control is not executed. That is, when the low output control is executed, controllability of the amount of air that is introduced into the cylinders improves. As a result, it is possible to further stably set the output of the engine 100 to a low output.

The valve lift and valve operating angle of each intake valve 118 may be changed continuously (steplessly) or may be changed discretely (stepwisely).

Figure 13:
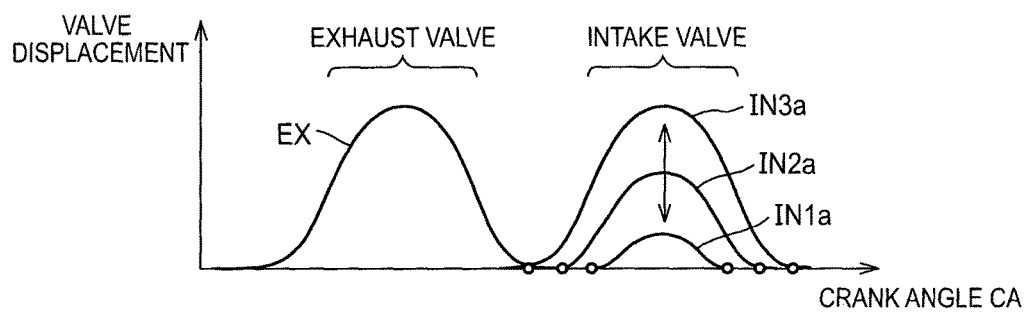
FIG. 13 is a graph that shows the correlation between a crank angle and a valve displacement that is achieved by a VVL device that is able to change the operation characteristic of each intake valve in three steps.

FIG. 13 is a graph that shows the correlation between a crank angle and a valve displacement that is achieved by a VVL device 400A that is able to change the operation characteristic of each intake valve 118 in three steps. The VVL device 400A is configured to be able to change the operation characteristic to any one of first to third characteristics. The first characteristic is indicated by a waveform IN1a. The second characteristic is indicated by a waveform IN2a. The valve lift and the valve operating angle in the second characteristic are larger than the valve lift and the valve operating angle in the first characteristic. The third characteristic is indicated by a waveform IN3a. The valve lift and the valve operating angle in the third characteristic are larger than the valve lift and the valve operating angle in the second characteristic.

Figure 14:
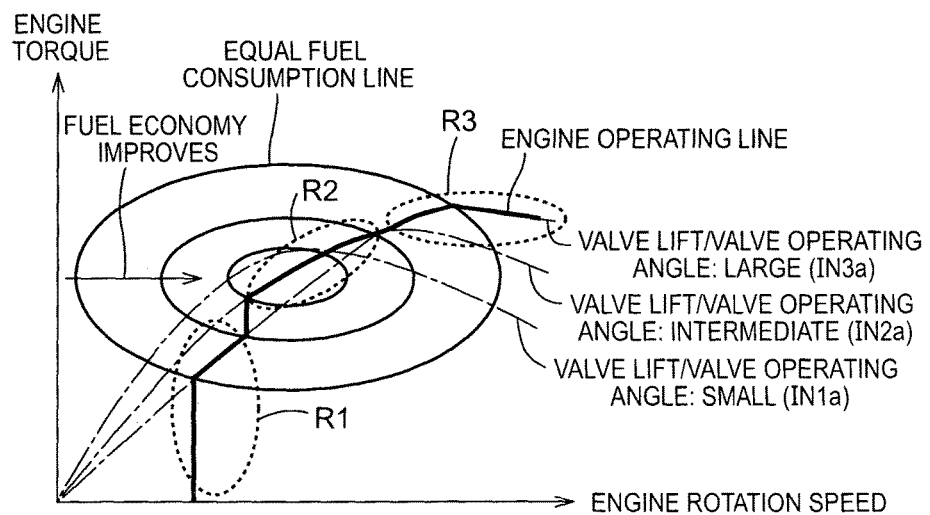
FIG. 14 is a graph that shows an operating line of an engine including the VVL device having the operation characteristics shown in FIG. 13.

FIG. 14 is a graph that shows an operating line of an engine 100A including the VVL device 400A having the operation characteristics shown in FIG. 13. In FIG. 14, the abscissa axis represents engine rotation speed, and the ordinate axis represents engine torque. The alternate long and short dashed lines in FIG. 13 indicate torque characteristics corresponding to the first to third characteristics (IN1a to IN3a). The circles indicated by the continuous line in FIG. 14 indicate equal fuel consumption lines. Each equal fuel consumption line is a line connecting points at which a fuel consumption amount is equal. The fuel economy improves as approaching the center of the circles. The engine 100A is basically operated along the engine operating line indicated by the continuous line in FIG. 14.

In a low rotation speed region indicated by the region R1, it is important to reduce shock at engine start-up. In addition, introduction of exhaust gas recirculation (EGR) gas is stopped, and fuel economy is improved by using the Atkinson cycle. The third characteristic (IN3a) is selected as the operation characteristic of each intake valve 118 so that the valve lift and valve operating angle increase. In an intermediate rotation speed region indicated by the region R2, fuel economy is improved by increasing the amount of introduction of EGR gas. Thus, the second characteristic (IN2a) is selected as the operation characteristic of each intake valve 118 so that the valve lift and the valve operating angle are intermediate.

That is, when the valve lift and valve operating angle of each intake valve 118 are large (third characteristic), improvement in fuel economy by using the Atkinson cycle is given a higher priority than improvement in fuel economy by introduction of EGR gas. On the other hand, when the intermediate valve lift and valve operating angle are selected (second characteristic), improvement in fuel economy by introduction of EGR gas is given a higher priority than improvement in fuel economy by using the Atkinson cycle.

In a high rotation speed region indicated by the region R3, a large amount of air is introduced into each cylinder by the inertia of intake air, and the output performance is improved by increasing an actual compression ratio. The third characteristic (IN3a) is selected as the operation characteristic of each intake valve 118 so that the valve lift and valve operating angle increase.

When the engine 100A is operated at a high load in the low rotation speed region, when the engine 100A is started up at an extremely low temperature or when a catalyst is warmed up, the first characteristic (IN1a) is selected as the operation characteristic of each intake valve 118 so that the valve lift and the valve operating angle decrease. In this way, the valve lift and the valve operating angle are determined on the basis of the operating state of the engine 100A.

Figure 15:
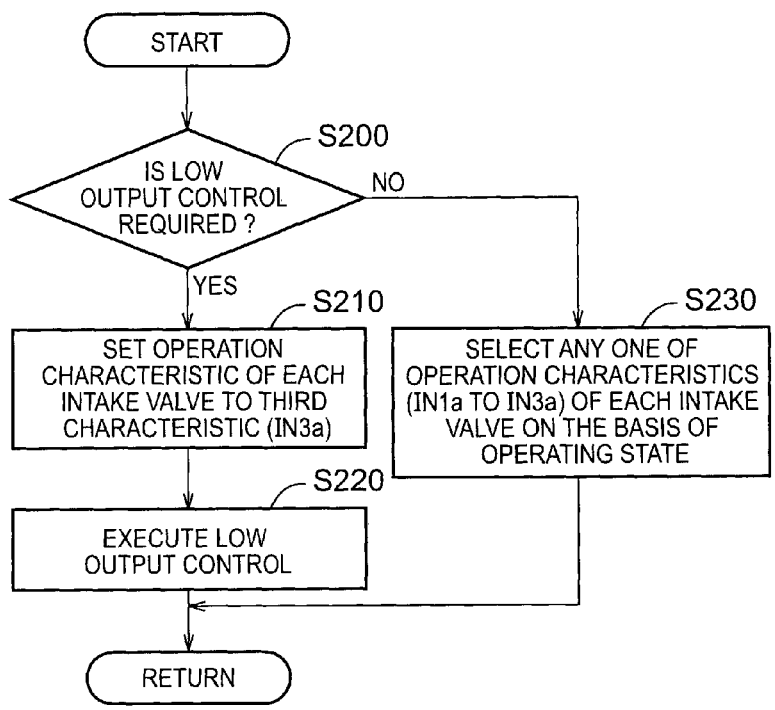
FIG. 15 is a flowchart that shows the control structure of intake valve control that is executed by the controller that controls the VVL device having the operation characteristics shown in FIG. 13.

FIG. 15 is a flowchart that shows the control structure of intake valve control that is executed by a controller 200A that controls the VVL device 400A having the operation characteristics shown in FIG. 13. As shown in FIG. 15, the controller 200A determines in S200 whether the low output control is required. When it is determined that the low output control is required (YES in S200), the controller 200A controls the VVL device 400A such that the operation characteristic of each intake valve 118 is set to the third characteristic (IN3a). Subsequently, in S220, the controller 200A executes the low output control.

On the other hand, when it is determined that the low output control is not required (NO in S200), the controller 200A controls the VVL device 400A such that the operation characteristic (IN1a to IN3a) of each intake valve 118 is selected on the basis of the operating state (S230).

With such a configuration, the operation characteristic, that is, the valve lift and the valve operating angle, of each intake valve 118 is limited to three characteristics. Therefore, it is possible to reduce a time that is required to adapt control parameters for controlling the operating state of the engine 100A in comparison with the case where the valve lift and valve operating angle of each intake valve 118 continuously change. In addition, torque that is required of the actuator for changing the valve lift and valve operating angle of each intake valve 118 is reduced. Therefore, it is possible to reduce the size and weight of the actuator. Therefore, it is possible to reduce the manufacturing cost of the actuator.

Figure 16:
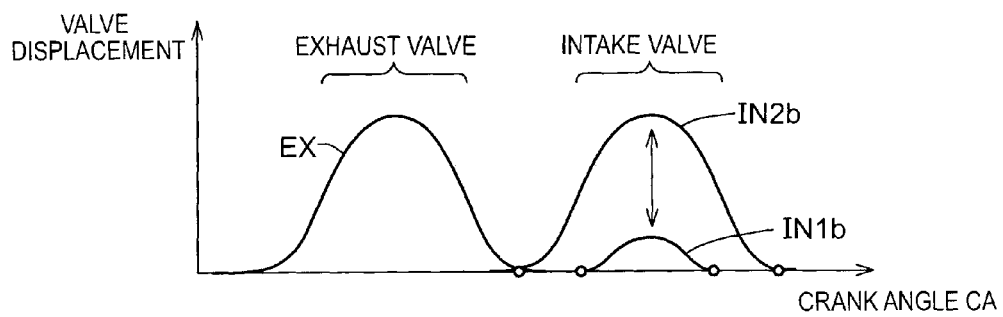
FIG. 16 is a graph that shows the correlation between a crank angle and a valve displacement that is achieved by a VVL device that is able to change the operation characteristic of each intake valve in two steps.

FIG. 16 is a graph that shows the correlation between a crank angle and a valve displacement that is achieved by a VVL device 400B that is able to change the operation characteristic of each intake valve 118 in two steps. The VVL device 400B is configured to be able to change the operation characteristic to one of first and second characteristics. The first characteristic is indicated by a waveform IN1b. The second characteristic is indicated by a waveform IN2b. The valve lift and the valve operating angle in the second characteristic are larger than the valve lift and the valve operating angle in the first characteristic. In this case, when the low output control is required, the VVL device 400B is controlled such that the operation characteristic of each intake valve 118 is set to the second characteristic.

With such a configuration, the operation characteristic, that is, the valve lift and the valve operating angle, of each intake valve 118 is limited to two characteristics. Therefore, it is possible to further reduce a time that is required to adapt control parameters for controlling the operating state of the engine 100. In addition, it is possible to further simplify the configuration of the actuator. The operation characteristic, that is, the valve lift and the valve operating angle, of each intake valve 118 is not limited to the case where the operation characteristic is changed in two steps or in three steps. The operation characteristic may be changed in any number of steps larger than or equal to four steps.

Figure 17:
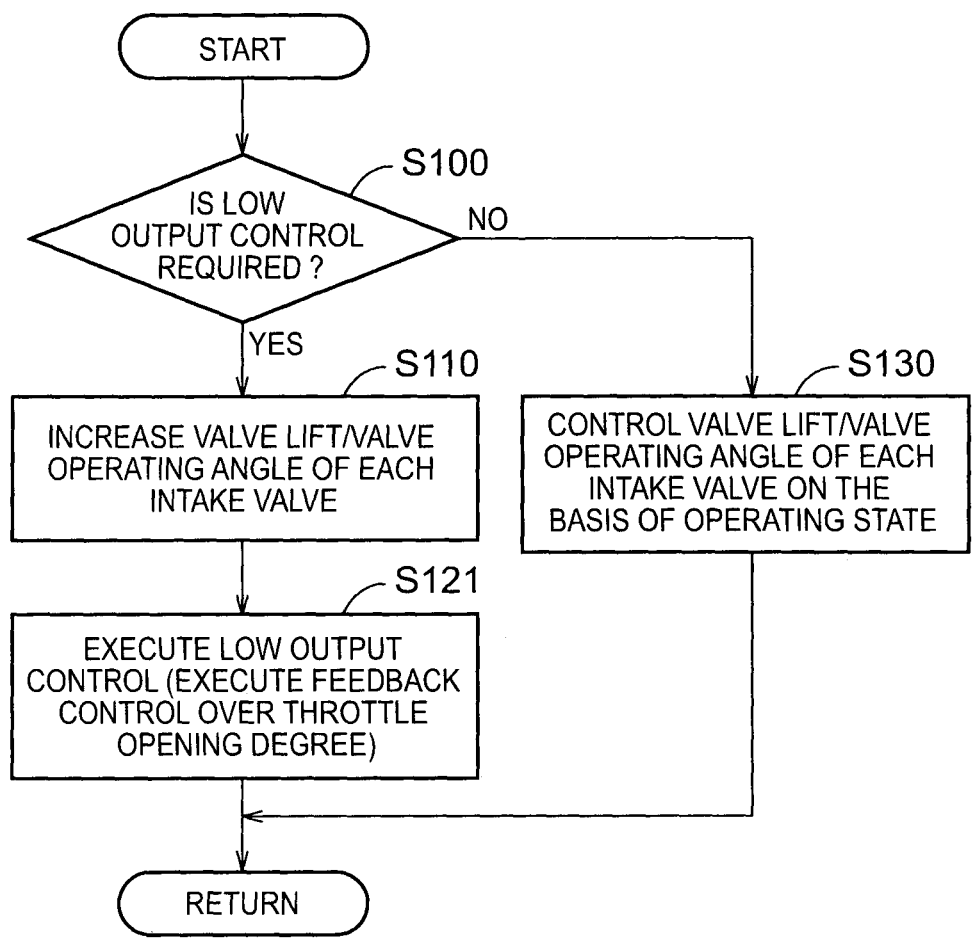
FIG. 17 is a flowchart that shows the control structure of intake valve control that is executed by a controller according to a first alternative embodiment to the embodiment of the invention.

FIG. 17 is a flowchart that shows the control structure of intake valve control that is executed by a controller 200B according to a first alternative embodiment to the embodiment of the invention. The other configuration of the controller 200B according to the first alternative embodiment to the embodiment is similar to that of the embodiment.

Referring to FIG. 17, S100, S110, and S130 are similar to those of the embodiment, so the description will not be repeated. When the valve lift and valve operating angle of each intake valve 118 are increased in S110, the controller 200B executes the low output control (S121). The controller 200B executes feedback control over the throttle opening degree while executing the low output control.

Specifically, the controller 200B executes feedback control over the throttle opening degree such that the throttle opening degree approaches a target opening degree for reducing the output of the engine 100 below a predetermined output. As described above, the predetermined output is, for example, the output of the engine 100, which is determined so that electric power for charging the electrical storage device B does not become excessive. As an example, the controller 200B controls the throttle opening degree so that the throttle opening degree that is detected by the throttle opening degree sensor 306 follows the target opening degree. Thus, the throttle opening degree is kept within a predetermined control range including the target opening degree.

In the low output control, it is required to keep the engine torque within a predetermined range; however, when the control range of the throttle opening degree that is required to execute the low output control is narrow, it is difficult to keep the engine torque within the predetermined range through feedback control over the throttle opening degree.

By increasing the valve lift and valve operating angle of each intake valve 118, it is possible to make a change in engine torque for the throttle opening degree mild. Therefore, it is possible to expand the control range of the throttle opening degree that is required to execute the low output control. Thus, it becomes easy to keep the engine torque within the predetermined range through feedback control.

As described above, in this first alternative embodiment to the embodiment, by increasing the valve lift and valve operating angle of each intake valve 118, it is possible to expand the control range of the throttle opening degree that is required to execute the low output control, so it becomes easy to keep the engine torque at a desired output through feedback control over the throttle opening degree.

Figure 18:
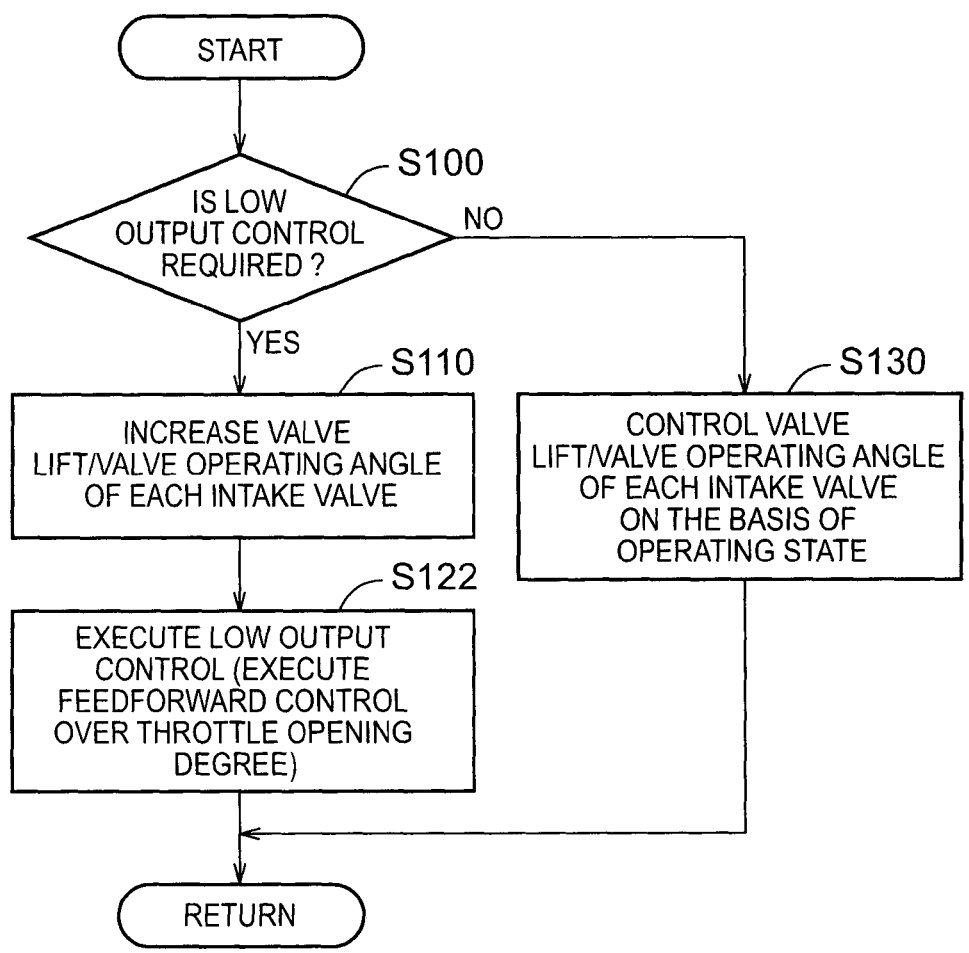
FIG. 18 is a flowchart that shows the control structure of intake valve control that is executed by a controller according to a second alternative embodiment to the embodiment of the invention.

FIG. 18 is a flowchart that shows the control structure of intake valve control that is executed by a controller 200C according to a second alternative embodiment to the embodiment of the invention. The other configuration of the controller 200C according to the second alternative embodiment to the embodiment is similar to that of the embodiment.

Referring to FIG. 18, S100, S110, and S130 are similar to those of the embodiment, so the description will not be repeated. When the valve lift and valve operating angle of each intake valve 118 are increased in S110, the controller 200C executes the low output control (S122). The controller 200C executes feedforward control over the throttle opening degree while executing the low output control.

Specifically, the controller 200C executes feedforward control over the throttle opening degree such that the throttle opening degree becomes a target opening degree for reducing the output of the engine 100 below a predetermined output. The predetermined output is also, for example, the output of the engine 100, which is determined so that electric power for charging the electrical storage device B does not become excessive. As an example, the controller 200C calculates an operation amount for setting the throttle opening degree to the target opening degree on the basis of the correlation between the throttle opening degree and the operation amount of the throttle valve 104, and controls the throttle opening degree on the basis of the calculated operation amount. Thus, the throttle opening degree corresponding to the calculated operation amount is achieved.

In the low output control, it is required to keep the engine torque within a predetermined range. However, as the throttle opening degree that is required to execute the low output control becomes closer to a fully closed state, more accurate control over the throttle opening degree is required. Therefore, it is difficult to keep the engine torque within the predetermined range through feedforward control over the throttle opening degree.

The throttle opening degree that is required to execute the low output control at the time when the valve lift and valve operating angle of each intake valve 118 are large is larger than the throttle opening degree that is required to execute the low output control at the time when the valve lift and valve operating angle of each intake valve 118 are small. Therefore, the throttle opening degree is controlled in a region remote from a state close to a fully closed state, so it is easy to keep the output of the engine 100 within the predetermined range through feedforward control.

As described above, in this second alternative embodiment to the embodiment, by increasing the valve lift and valve operating angle of each intake valve 118, it is possible to increase the throttle opening degree that is required to execute the low output control, so it becomes easy to keep the engine torque at a desired output through feedforward control over the throttle opening degree.

In the above-described embodiment, the case where both the valve lift and valve operating angle of each intake valve 118 are changed is described. The invention is also applicable to a configuration that only the valve lift of each intake valve 118 is changeable or a configuration that only the valve operating angle of each intake valve 118 is changeable. With the configuration that one of the valve lift and valve operating angle of each intake valve 118 is changeable as well, similar advantageous effects to those in the case where both the valve lift and valve operating angle of each intake valve 118 are changeable. The actuator that is able to change one of the valve lift and valve operating angle of each intake valve 118 may be implemented by utilizing a known technique.

In the above-described embodiments, the series-parallel hybrid vehicle that is able to transmit the power of the engine 100 by distributing the power of the engine 100 to the drive wheels 6 and the motor generators MG1, MG2 by the power split device 4. The invention is also applicable to a hybrid vehicle of another type. That is, the invention is also applicable to, for example, a so-called series hybrid vehicle in which the engine 100 is only used to drive the motor generator MG1 and the driving force of the vehicle is generated by only the motor generator MG2, a hybrid vehicle in which only regenerative energy within kinetic energy generated by the engine 100 is recovered as electric energy, a motor-assist hybrid vehicle in which the engine is used as a main power source and a motor, where necessary, assists, or the like. The invention is also applicable to a hybrid vehicle that travels by using the power of only the engine while the motor is separated.

In the above description, the engine 100 corresponds to one example of an "internal combustion engine" according to the invention, and the motor generator MG1 corresponds to one example of a "rotary electric machine" according to the invention. The VVL device 400 corresponds to one example of a "variable valve actuating device" according to the invention.

The embodiment of the invention and the first and second alternative embodiments to the embodiment of the invention are described above; however, the configurations of the embodiment and first and second alternative embodiments may be combined with each other as needed.

The embodiment described above should be regarded as only illustrative in every respect and not restrictive. The scope of the invention is defined by the appended claims rather than the description of the above embodiment. The scope of the invention is intended to encompass all modifications within the scope of the appended claims and equivalents thereof.

The invention claimed is:

1. A hybrid vehicle comprising:
an internal combustion engine including a variable valve actuating device and a throttle valve, the variable valve actuating device being configured to change an operation characteristic of an intake valve, the throttle valve being configured to adjust an amount of air that flows into a cylinder;
a rotary electric machine configured to generate electric power by using an output of the internal combustion engine;
an electrical storage device configured to be charged upon reception of electric power generated by the rotary electric machine; and
a controller configured to
execute output control in which an opening degree of the throttle valve being controlled such that, when a temperature of the electrical storage device is lower than a predetermined temperature, the output of the internal combustion engine is reduced below a predetermined output, and
control the variable valve actuating device such that at least one of a valve lift or valve operating angle of the intake valve at the time when the output control is executed is larger than the corresponding at least one of the valve lift or valve operating angle of the intake valve at the time when the output control is not executed.

2. The hybrid vehicle according to claim 1, wherein
the variable valve actuating device is configured to change the operation characteristic of the intake valve to any one of a first characteristic, a second characteristic and a third characteristic,
at least one of the valve lift or the valve operating angle of the second characteristic is larger than the corresponding at least one of the valve lift or the valve operating angle of the first characteristic, and
at least one of the valve lift or the valve operating angle of the third characteristic is larger than the corresponding at least one of the valve lift or the valve operating angle of the second characteristic.

3. The hybrid vehicle according to claim 1, wherein
the variable valve actuating device is configured to change the operation characteristic of the intake valve to one of a first characteristic and a second characteristic, and
at least one of the valve lift or the valve operating angle of the second characteristic is larger than the corresponding at least one of the valve lift or the valve operating angle of the first characteristic.

4. The hybrid vehicle according to claim 1, wherein
electric power for charging the electrical storage device at the time when the electrical storage device is in a second state is more limited than electric power for charging the electrical storage device at the time when the electrical storage device is in a first state, the temperature of the electrical storage device in the second state is lower than the temperature of the electrical storage device in the first state, and
the controller is configured to execute the output control when the electrical storage device is in the second state.

5. The hybrid vehicle according to claim 1, wherein
the controller is configured to execute feedback control over the opening degree of the throttle valve such that the opening degree of the throttle valve approaches a target opening degree, and the target opening degree is the opening degree of the throttle valve, at which the output of the internal combustion engine is lower than the predetermined output.

6. The hybrid vehicle according to claim 1, wherein
the controller is configured to execute feedforward control over the opening degree of the throttle valve such that the opening degree of the throttle valve becomes a target opening degree, and the target opening degree is the opening degree of the throttle valve, at which the output of the internal combustion engine is lower than the predetermined output.

7. A control device for a hybrid vehicle, the hybrid vehicle including an internal combustion engine, a rotary electric machine and an electrical storage device, the internal combustion engine including a variable valve actuating device and a throttle valve, the variable valve actuating device being configured to change an operation characteristic of an intake valve, the throttle valve being configured to adjust an amount of air that flows into a cylinder, the control device comprising:
a controller configured to
execute output control in which an opening degree of the throttle valve is controlled such that, when a temperature of the electrical storage device is lower than a predetermined temperature, an output of the internal combustion engine is reduced below a predetermined output, and
control the variable valve actuating device such that at least one of a valve lift or valve operating angle of the intake valve at the time when the output control is executed is larger than the corresponding at least one of the valve lift or valve operating angle of the intake valve at the time when the output control is not executed.

8. A control method for a hybrid vehicle, the hybrid vehicle including an internal combustion engine, a rotary electric machine, an electrical storage device and a controller, the internal combustion engine including a variable valve actuating device and a throttle valve, the variable valve actuating device being configured to change an operation characteristic of an intake valve, the throttle valve being configured to adjust an amount of air that flows into a cylinder, the control method comprising:
executing, by the controller, output control in which an opening degree of the throttle valve is controlled such that, when a temperature of the electrical storage device is lower than a predetermined temperature, an output of the internal combustion engine is reduced below a predetermined output; and
controlling the variable valve actuating device by the controller such that at least one of a valve lift or valve operating angle of the intake valve at the time when the output control is executed is larger than the corresponding at least one of the valve lift or valve operating angle of the intake valve at the time when the output control is not executed.

* * * * *